Figure 1:
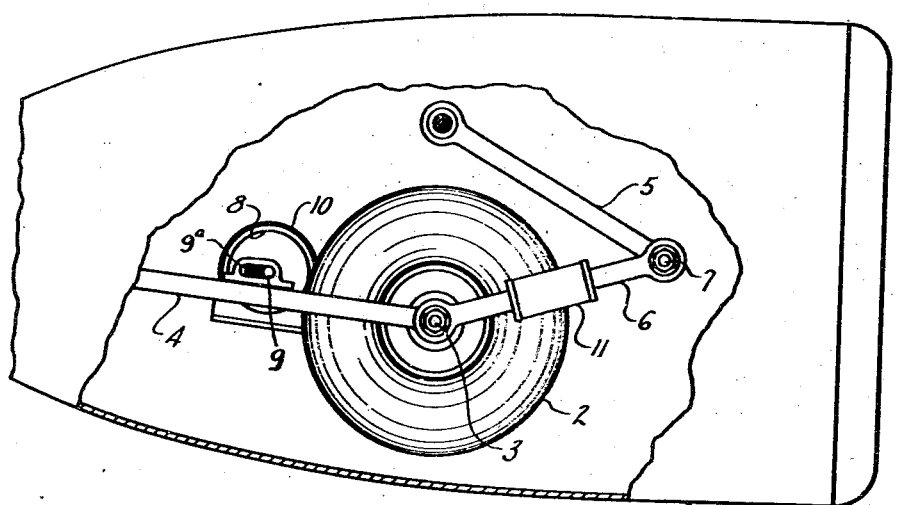

Oct. 8, 1946.  R. P. MURDOCH  2,408,870
AIRCRAFT LANDING GEAR
Filed April 12, 1943

INVENTOR.
Robert P. Murdoch
BY William B. Jaspert
Attorney.

Patented Oct. 8, 1946

2,408,870

UNITED STATES PATENT OFFICE 2,408,870

AIRCRAFT LANDING GEAR

Robert P. Murdoch, Mount Lebanon, Pa.

Application April 12, 1943, Serial No. 482,686

1 Claim. (Cl. 244—103)

This invention relates to new and useful improvements in aircraft landing gear, and it is among the objects thereof to provide means for rotating the wheels of aircraft preparatory to landing to avoid the abrasive action of the ground surface on the wheels resulting if the wheels are static.

It has heretofore been proposed to utilize vanes on the wheels of airplanes, which will rotate the wheels in response to the air flow when the landing gear is dropped prior to landing. An obvious disadvantage of this type of actuator is the added resistance or load in the take-off as the wheels cannot be immediately retracted until the ship has reached a safe altitude.

In accordance with the present invention, means are provided to positively drive the wheels by a prime mover contained within the wheel housing or mounted on the wheel carriage, thereby offering no resistance to the normal flight of the plane.

The invention further contemplates a motor drive which shall maintain positive contact with the wheel at all times so that the wheels may be positively rotated when the landing gear is in its fully extended position.

A further object of the invention is the provision of a motor drive which shall be capable of revolving the landing wheels at approximately the landing speed of the plane, and still a further object of the invention is the provision of means for automatically energizing the motor circuit when the carriage has been extended to landing position, and to automatically disconnect the motor from the power circuit when the plane is landed.

Figure 2:
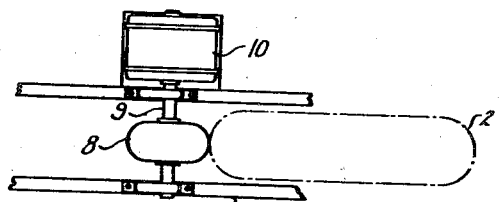
Figure 3:
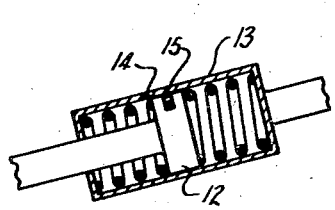
Figure 4:
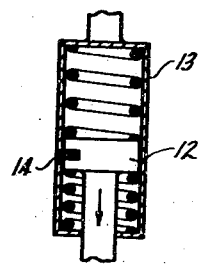
Figure 5:
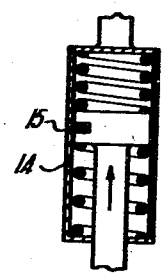

These and other objects of the invention will become more apparent from a consideration of the accompanying drawing constituting a part hereof in which like reference characters designate like parts, and in which:

Fig. 1 is a front elevational view of an airplane motor housing partially cut away, showing the landing gear embodying the principles of this invention;

Fig. 2 a top plan view of the wheel drive and a portion of the wheel carriage; and Figs. 3, 4 and 5 vertical cross-sectional views of a shock absorber on the wheel carriage having electrical contacts therein.

With reference to the several figures of the drawing, the numeral 1 designates the engine nacelle, having the landing gear mounted on one side thereof, the landing gear comprising the inflated rubber tires or wheels 2 journalled on axle 3, mounted on the carriage generally designated by the numeral 4. The carriage is provided with links 5 and 6 pivoted at 7 and to the wheel axle 3, and are shown in the retracted position, the links being a toggle which forms a straight vertical strut when the wheel carriage is dropped.

The invention does not involve the operating mechanism for the wheel carriage, which is therefore not shown. Mounted on the carriage frame 4 is a friction drive wheel 8 rotatable by a shaft 9 of an electric motor 10, the shaft 9 being biased by springs 9ª so that the friction wheel 8 is at all times in contact with the outer periphery of the landing wheel 2 to be capable of rotating the latter when it is free and off the ground.

The arm 6 of the toggle is split and provided with a shock absorber 11 which may be of the spring or pneumatic type, or both, in which a piston member 12 operates in a cylinder 13. The cylinder is provided with an electrical contact 14 which constitutes a terminal in the circuit of motor 10, and the piston 12 is provided with the spring biased contact 15 which also constitutes a terminal of the circuit of motor 10.

Contacts 14 and 15 are shown separated in the position of the shock absorber in Fig. 3, which is the position of same in the retracted position of the landing gear.

In Fig. 4 when the links 5 and 6 of the toggle are vertical, the piston 12 is displaced to the position where terminals 14 and 15 contact to energize the drive motor 10, and in Fig. 5 the terminals 14 and 15 are separated by the weight of the plane on the landing gear after the plane is landed. In this position, the motor circuit is broken and the drive motor 10 stops.

To control rotation of the landing wheels 2 to proximate the speed of the wheels at the normal landing speed of the plane, the drive motor 10 is wound as a constant speed torque motor, developing a maximum speed corresponding to the peripheral speed of the wheels at the landing speed of the plane. When the carriage is lowered, which establishes the power circuit for the drive motor 10, it will rotate at slow speed while developing the torque needed to rotate wheel 2 and gradually bring it up to the landing speed which is the maximum speed of the motor 10.

Although one embodiment of the invention has been herein illustrated and described, it will be evident to those skilled in the art that various modifications may be made in the details of construction without departing from the principles herein set forth.

I claim:

In combination with a landing gear and landing wheels for aircraft, a positive drive for said wheel comprising a friction wheel in contact with the outer periphery of the landing wheel, an electric motor for driving said friction wheel, and means responsive to movement of the landing gear to its extended position for energizing said motor and for deenergizing the motor circuit by the impact of the landing wheel with the ground.

ROBERT P. MURDOCH.